3,703,553
DIMERIZATION OF 2-AMINOMETHYL-1,3-BUTADIENE
Griffin D. Jones and Nancy B. Tefertiller, Midland, Mich., assignors to The Dow Chemical Company, Midland, Mich.
No Drawing. Filed Sept. 10, 1969, Ser. No. 856,839
Int. Cl. C07c 87/38
U.S. Cl. 260—563 R                          8 Claims

ABSTRACT OF THE DISCLOSURE

The cyclic dimer of 2-aminomethyl-1,3-butadiene is formed by reacting in solution the monomer with a Brönsted acid. A free-radical scavenger, such as hydroquinone, is preferably added as a polymerization inhibitor.

The cyclic dimer is useful as an epoxy curing agent.

SUMMARY OF THE INVENTION

It has now been discovered that the novel cyclic dimer of 2-aminomethyl-1,3-butadiene is formed in the novel process comprising reacting in solution 2-aminomethyl-1,3-butadiene, hereinafter AMB, with a Brönsted acid. The novel dimer is useful as an epoxy curing agent.

A suitable Brönsted acid is any selected from the known group of Brönsted acids. Examples of suitable acids include HCl, HBr, HI, $H_2SO_4$, $H_3PO_4$, and other like protic acids. The preferred acid is HCl. Mixtures of such acids are likewise operable.

The amount of acid in the subject process is suitably at least 1 equivalent of acid per mole of AMB, and, a slight stoichiometric excess of acid is preferred. Less than one equivalent of acid may be used but the product yield, based on AMB, is correspondingly lowered.

Solvents for the subject process may be any compound(s) which dissolves the reactants. Examples of such solvents include water, lower alkanols having 1 to 4 carbon atoms, ketones, such as acetone and methyl ethyl ketone, and other like compounds, and mixtures thereof. The protonated AMB monomer is quite soluble in water alone. Hence, water is the preferred solvent.

The amount of solvent is not critical, but the reaction is conveniently conducted at a solids concentration of from about 20% to about 80% by total weight basis.

The reaction temperature is suitably between about 50° C. and about 100° C., and is preferably between about 60° C. and about 75° C. Higher or lower temperatures may be used, but at lower temperatures the reaction rate is too low to be practical and at higher temperatures competing side reactions, such as polymerization, tend to lower the product yield.

The reaction pressure is not critical. Atmospheric pressure is convenient and therefore preferred.

The atmosphere above the reaction is not critical. Hence, the reaction may be conducted in an open or a sealed reaction vessel and may be conducted under an inert gas, such as nitrogen.

A small but sufficient amount of a free-radical scavenger, such as hydroquinone, is advantageously included in the process to inhibit polymerization.

AMB and the acid should be maintained in contact one with the other under the process conditions until the desired product is formed. Typically, a reaction time of a few hours to a few days is sufficient for the reaction to be substantially completed. The longer reaction times, e.g., from about 3 to about 7 days, at the preferred temperature range are advantageous in that the product yield is increased.

The free amine product is obtained from the reaction mixture by adding enough base, such as NaOH or KOH, to neutralize the residual acid and amine salts, and thereafter recovering the free amine product by any known convenient method, such as extraction, etc.

SPECIFIC EMBODIMENTS

The following example further illustrates the invention.

Preparation of 2-aminomethyl-1,3-butadiene

To 48 g. (0.47 mole) of 2-chloromethyl-1,3-butadiene in a pressure vessel cooled below —40° C. with liquid nitrogen was added 200 g. (11.8 moles) of anhydrous ammonia. The reactor was sealed and allowed to warm to room temperature with agitation. After stirring for about 12 hours at room temperature, the unreacted liquid ammonia was slowly vented. The residual product-ammonium chloride mixture was extracted with ether and the liquid extract distilled to yield 19.3 g. (49% yield) of 2-aminomethyl-1,3-butadiene, B.P. 35° C. at 30 mm. Its purity by titration with standard hydrochloric acid was 94%. Analysis by nuclear magnetic resonance indicated a purity of 96% with 4% isoprene. Further confirmation of its structure and purity was obtained from infrared and mass spectra.

EXAMPLE 1

2-aminomethyl-1,3-butadiene (35 g.) was added to 35.5 ml. of concentrated HCl with stirring and cooling in a reaction vessel equipped with a condenser and a mechanical stirrer. To the reaction mixture was added 231 ml. of water and 0.077 g. of hydroquinone. The reaction mixture was warmed with stirring at a temperature between 65–72° C. for about 6 days, and then allowed to stand for about 6 days at room temperature. Analysis by nuclear magnetic resonance (NMR) indicated about 65–80% of the starting material was converted to the dimer. Flake KOH (22.3 g.) was added to neutralize the acid in the mixture. A deep brown liquid layer was separated by salting out with potassium carbonate, i.e., by adding potassium carbonate to the mixture until there was a sharp separation between the inorganic and organic layers. The dimer was obtained from the organic layer by distillation under reduced pressure. A structure consistent with I or II below was supported by NMR, infrared analysis, and elemental analysis.

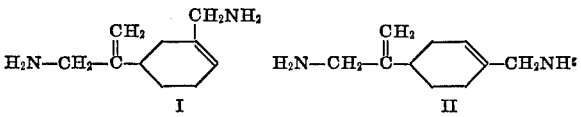

The above dimer (0.55 g.) was mixed with DER 331 (2.45 g.), a commercially available epoxy resin which is produced by The Dow Chemical Co. and has an epoxide equivalent weight of about 189, and the mixture was held at room temperature for two days. The sample was firm and partially cured. The partially cured sample was then heated at 100° C. for 1 hour; the resin cured to a very hard, colorless solid.

We claim:

1. A process for preparing the cyclic dimer of 2-aminomethyl-1,3-butadiene comprising reacting by contacting in aqueous solution 2-aminomethyl - 1,3 - butadiene with a Brönsted acid.

2. The process defined in claim 1 wherein the reaction temperature is between about 50° C. and about 100° C.

3. The process defined in claim 2 wherein the reaction temperature is between about 60° C. and about 75° C.

4. The process defined in claim 1 wherein at least one equivalent of acid is present per mole of 2-aminomethyl-1,3-butadiene.

5. The process defined in claim 4 wherein the reaction temperature is between about 50° C. and about 100° C.

6. The process defined in claim 5 wherein said Brönsted acid is HCl or $H_2SO_4$.

7. The process defined in claim 6 wherein the reaction temperature is between about 60° C. and about 75° C., and wherein said Brönsted acid is HCl, and wherein a small but sufficient amount of hydroquinone is added to inhibit polymerization.

8. The cyclic dimer of 2-aminomethyl-1,3-butadiene produced by the process defined in claim 1.

References Cited

UNITED STATES PATENTS 3,201,484   8/1965   Myers et al. _____ 260—666 B

OTHER REFERENCES

Staudinger et al.: "Chem. Abstracts," vol. 17 (1923), p. 2974.

Wagner-Jauregg: "Chem. Abstracts," vol. 25 (1931), p. 5139.

Royals: "Advanced Org. Chemistry" (1954), p. 409.

LEWIS GOTTS, Primary Examiner

D. R. PHILLIPS, Assistant Examiner

U.S. Cl. X.R.

260—2 N, 47 EN